(12) United States Patent
Lee

(10) Patent No.: US 10,071,788 B1
(45) Date of Patent: Sep. 11, 2018

(54) SPEED CONTROL SYSTEM FOR ELECTRIC BICYCLES

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 18 days.

(21) Appl. No.: 15/451,419

(22) Filed: Mar. 7, 2017

(51) Int. Cl.
| | |
|---|---|
| *B60L 11/00* | (2006.01) |
| *B62M 6/50* | (2010.01) |
| *B60L 11/18* | (2006.01) |
| *B60L 15/20* | (2006.01) |
| *B62J 99/00* | (2009.01) |

(52) U.S. Cl.
CPC .......... *B62M 6/50* (2013.01); *B60L 11/1861* (2013.01); *B60L 15/20* (2013.01); *B62J 99/00* (2013.01); *B60L 2240/12* (2013.01); *B60L 2240/42* (2013.01); *B60L 2240/642* (2013.01); *B60Y 2200/13* (2013.01); *B60Y 2300/143* (2013.01); *B60Y 2300/181* (2013.01); *B60Y 2400/112* (2013.01); *B60Y 2400/3032* (2013.01); *B60Y 2400/92* (2013.01); *B62J 2099/002* (2013.01); *B62J 2099/0026* (2013.01)

(58) Field of Classification Search
CPC ....... B62M 6/50; B60L 11/1861; B60L 15/20; B60L 2240/12; B60L 2240/42; B60L 2240/642; B62J 99/00; B60Y 2200/13; B60Y 2300/143; B60Y 2300/181
USPC ............................................. 701/22, 36, 93
See application file for complete search history.

(56) References Cited

U.S. PATENT DOCUMENTS

| | | | |
|---|---|---|---|
| 2008/0177433 A1* | 7/2008 | Teo ..................... | B60L 11/1801 701/22 |
| 2014/0163797 A1* | 6/2014 | Schieffelin ............. | H04W 4/70 701/22 |

* cited by examiner

*Primary Examiner* — Gertrude Arthur Jeanglaude

(57) ABSTRACT

A speed control system for electric bicycles includes a bicycle having pedals, a motor and a battery which provides electric power to the motor. The bicycle includes a speed detector to detect speed of the bicycle to create a current speed value. A controller is electrically connected to the motor, the battery and the speed detector. The controller has a preset constant-speed setting value. The controller receives the current speed value from the speed detector, and compares the current speed value with the preset constant-speed setting value to adjust output of the motor and the battery. The controller changes the output of the motor and the battery according to the current speed so that the motor assists the rider to operate the bicycle instantly.

15 Claims, 5 Drawing Sheets

SPEED CONTROL SYSTEM FOR ELECTRIC BICYCLES

BACKGROUND OF THE INVENTION

1. Fields of the Invention

The present invention relates to a speed control system for electric bicycles.

2. Descriptions of Related Art

One of the conventional electric bicycle control systems known to applicant comprises a body, a rear wheel unit removably connected to the bicycle frame, a detection module connected to a transmission part of the bicycle so as to detect the operation of the transmission part and generate operational signals, a driving module, multiple driving units, a power module and a control module. The driving module includes a driving unit connected to the body and including multiple driving members. The driving units are connected to the driving members and rotatably connected to the rear wheel unit. The power module is electrically connected to the driving module and the detection module. The control module is electrically connected to the driving module, the detection module and the power module. The control module receives the operational signals and calculates a driving signal which is sent to the driving unit. The driving unit then drives the driving members according to the driving signal and drives the driving units. The driving units drive the rear wheel unit to move the bicycle.

However, the conventional control system only adjusts the internal resistance of the transmission in the bicycle. Only torque and speeds of gears are involved in the control system. The conventional control system is operated by several complicated processes and can only indirectly control the electric bicycle.

The driving force that the driving units apply to the rear wheel unit cannot change the speed of the bicycles so that the riders cannot acknowledge the difference of speed when applying force to the rear wheel unit. Therefore, the riders still have to tread the pedals hard.

The control electric bicycle control system involves complicated structure and high manufacturing cost.

The present invention intends to provide an electric bicycle control system to improve the shortcomings mentioned above.

SUMMARY OF THE INVENTION

The present invention relates to a speed control system for electric bicycles, and comprises a bicycle having pedals, a motor and a battery which provides electric power to the motor. A speed detector is connected to the bicycle and detects the speed of the bicycle so as to create a current speed value. A controller is connected to the bicycle and electrically connected to the motor, the battery and the speed detector. The controller has a preset constant-speed setting value. The controller receives the current speed value from the speed detector, and compares the current speed value with the preset constant-speed setting value so as to adjust output of the motor and the battery. When the current speed value is larger than the preset constant-speed setting value, the controller reduces the output of the motor and the battery. When the current speed value is smaller than the preset constant-speed setting value, the controller increases the output of the motor and the battery.

Preferably, a display member is connected to the controller so as to display speed of the bicycle detected by the speed detector. The controller monitors the electric power in the battery, and the electric power in the battery is displayed on the display member.

Preferably, a constant-speed button is electrically connected to the controller by a control cable. When the constant speed button is pressed when the bicycle is moving, the controller receives the current speed value from the speed detector, and sets the current speed value as the preset constant-speed setting value.

Preferably, the display is wirelessly connected to the controller.

Preferably, the speed detector includes a sensor which is connected to a front wheel of the bicycle so as to calculate revolutions of the front wheel. The speed detector calculates the current speed value of the bicycle by the revolutions of the front wheel, the diameter of the front wheel and the peripheral length of the front wheel.

Preferably, a slope detector is connected to the controller. The controller receives a value of road slope from the slope detector and adjusts output of the motor and the battery. When the slope detector detects that the bicycle moves along a downhill road, the controller reduces output of the motor and the battery. When the slope detector detects that the bicycle moves along an uphill road, the controller increases output of the motor and the battery.

The primary object of the present invention is to provide a speed control system for electric bicycles, wherein the controller changes the output of the motor and the battery according to the current speed so that the motor assists the rider to operate the bicycle instantly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
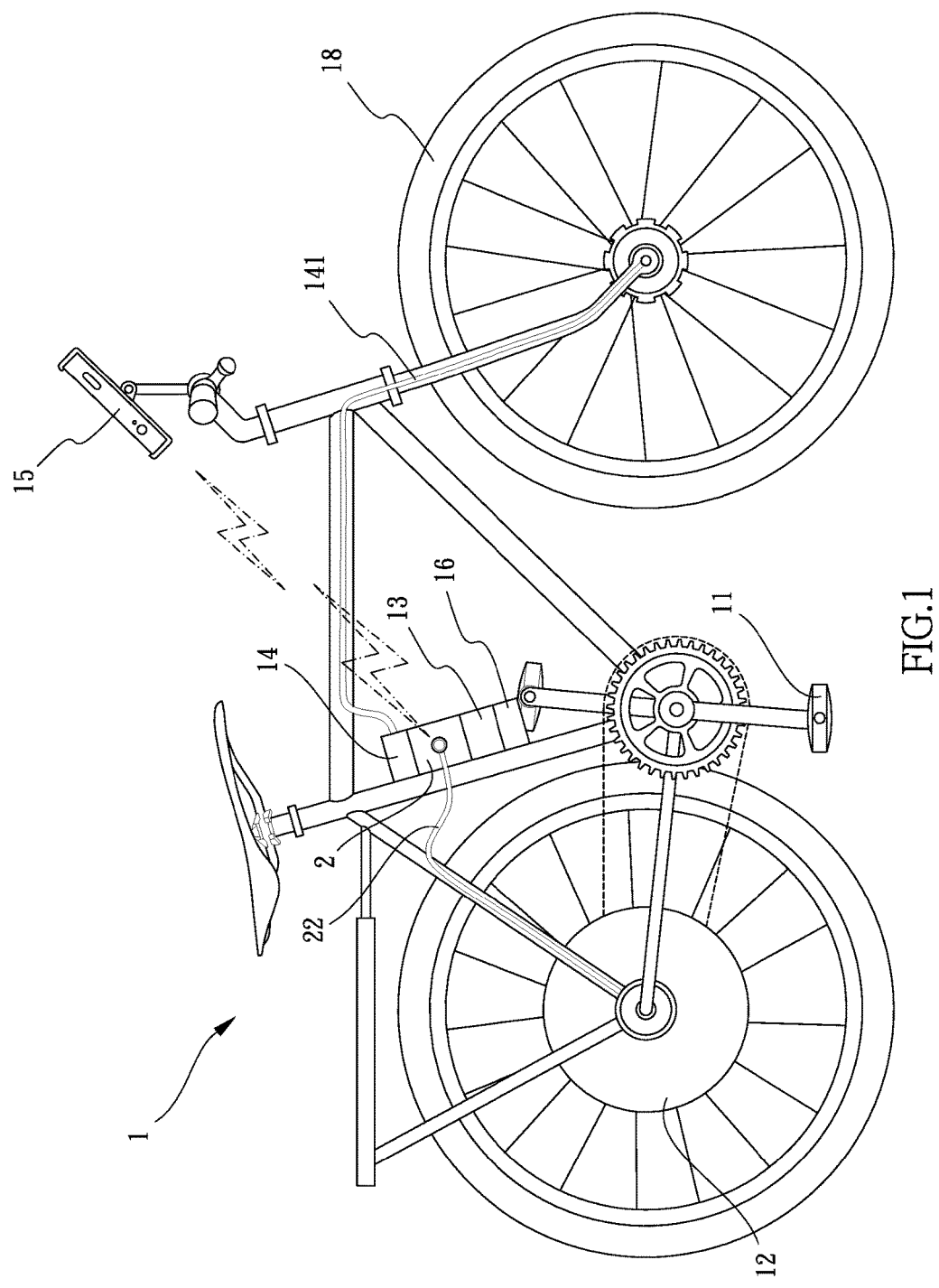
FIG. 1 shows the electric bicycle with the speed control system of the present invention.
Figure 2:
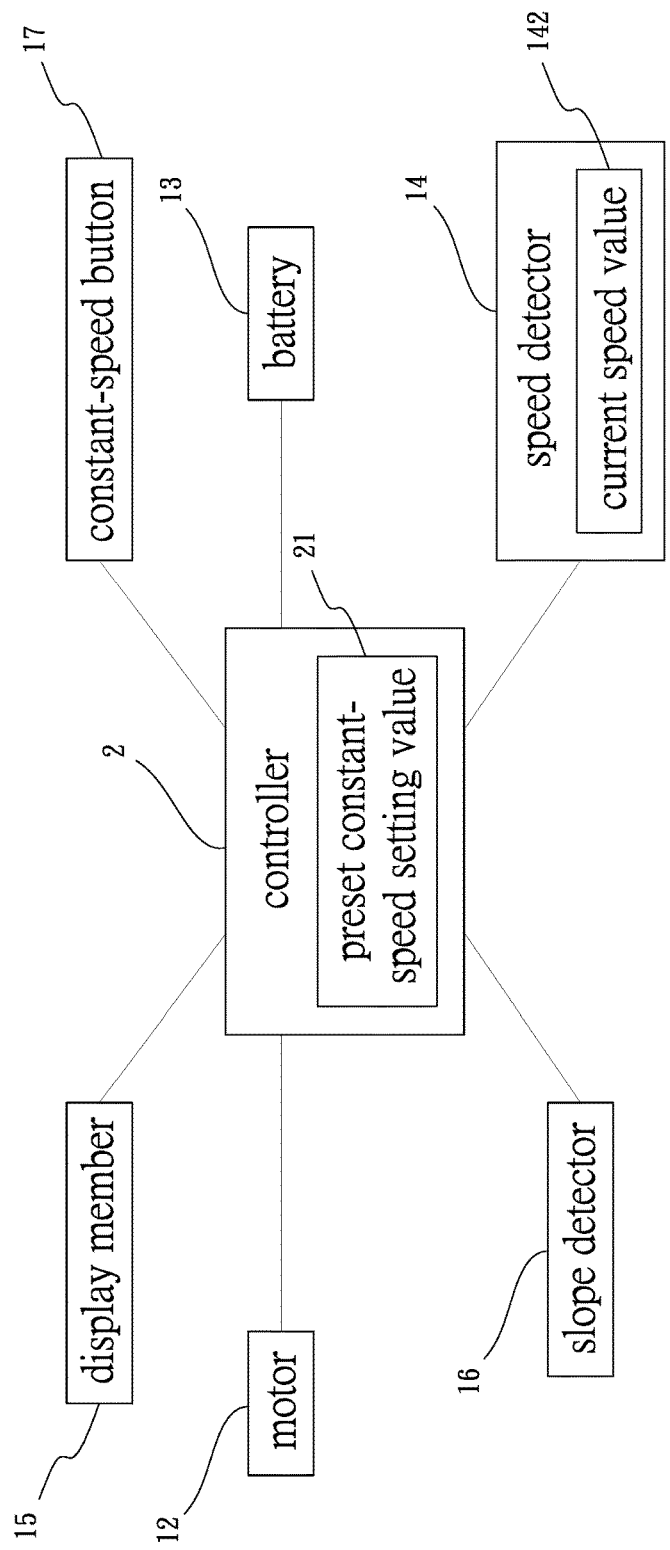
FIG. 2 shows the diagram of the speed control system of the present invention.
Figure 3:
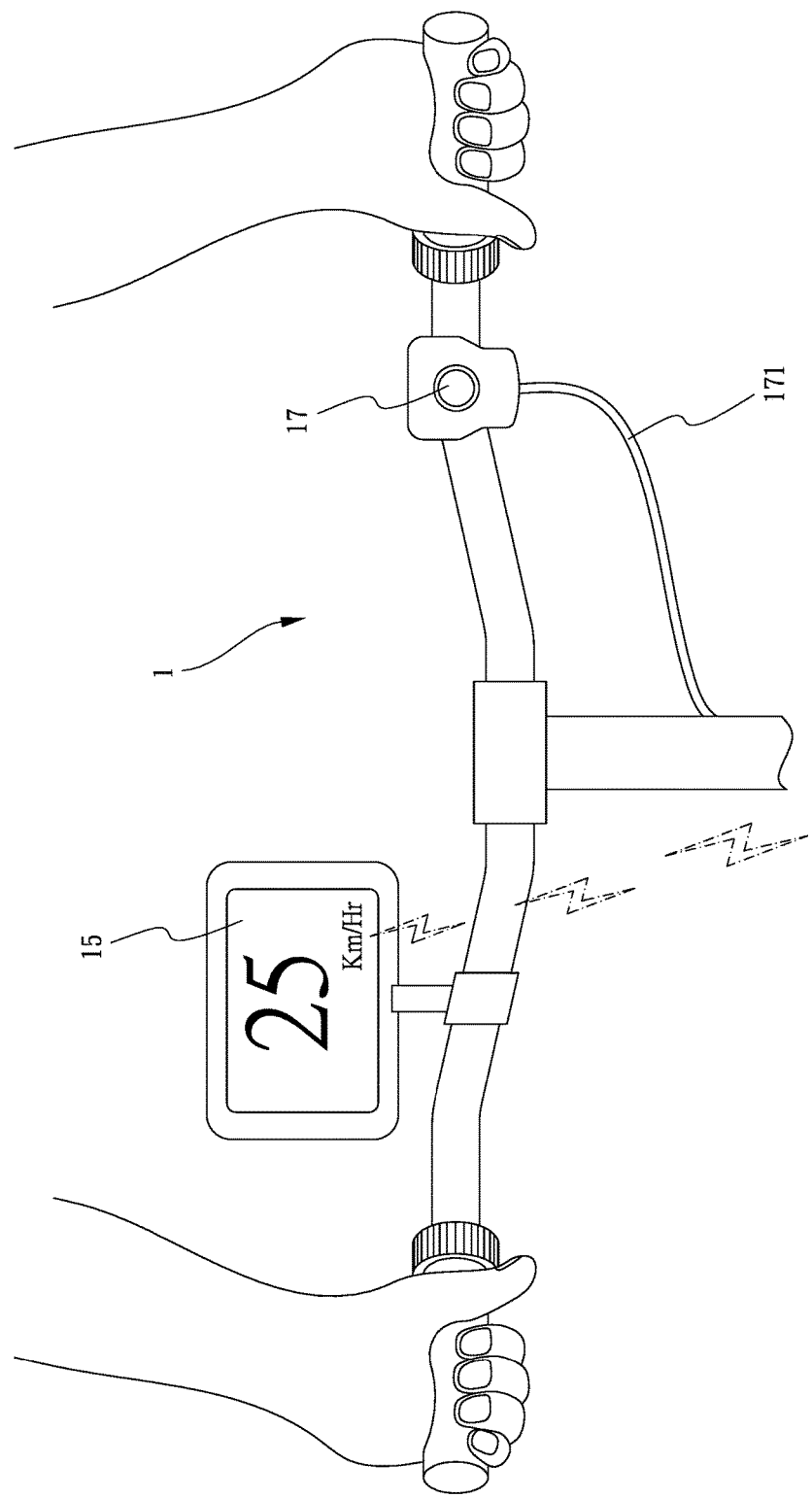
FIG. 3 illustrates a rider operates the speed control system of the present invention.

Referring to FIGS. 1 to 3, the speed control system of the present invention comprises a bicycle 1 having pedals 11, a motor 12 and a battery 13 which provides electric power to the motor 12. A speed detector 14 is connected to the bicycle 1 and detects the speed of the bicycle 1 so as to create a current speed value 142.

A controller 2 is connected to the bicycle 1 and electrically connected to the motor 12, the battery 13 and the speed detector 14. The controller 2 has a preset constant-speed setting value 21. The controller 2 receives the current speed value 142 from the speed detector 14, and compares the current speed value 142 with the preset constant-speed setting value 21 so as to adjust output of the motor 12 and the battery 13. When the current speed value 142 is larger than the preset constant-speed setting value 21, the controller 2 reduces the output of the motor 12 and the battery 13. When the current speed value 142 is smaller than the preset constant-speed setting value 21, the controller 2 increases the output of the motor 12 and the battery 13.

Specifically, the bicycle 1 includes a display member 15 which is connected to the controller 2 so as to display speed of the bicycle 1 detected by the speed detector 14. The controller 2 monitors electric power in the battery 13, and the electric power in the battery 13 is displayed on the display member 15. Besides, the bicycle 1 includes a constant-speed button 17 which is electrically connected to the controller 2 by a control cable 171. When the constant speed button 17 is pressed when the bicycle 1 is moving, the controller 2 receives the current speed value 142 from the speed detector 14 and sets the current speed value 142 as the preset constant-speed setting value 21. The display 15 is wirelessly connected to the controller 2.

Furthermore, the speed detector 14 includes a sensor 141 which is connected to the front wheel 18 of the bicycle 1 so as to calculate revolutions of the front wheel 18. The speed detector 14 calculates the current speed value 142 of the bicycle 1 by the revolutions of the front wheel 18, a diameter of the front wheel 18 and a peripheral length of the front wheel 18. The bicycle 1 further includes a slope detector 16 which is connected to the controller 2. The controller 2 receives the value of road slope from the slope detector 16 and adjusts output of the motor 12 and the battery 13. When the slope detector 16 detects that the bicycle 1 moves along a downhill road, the controller 2 reduces output of the motor 12 and the battery 13. When the slope detector 16 detects that the bicycle 1 moves along an uphill road, the controller 2 increases output of the motor 12 and the battery 13.

As shown in FIGS. 1 and 2, the controller 2 is connected to the motor 11 by a control cable 22. The sensor 141 is connected to the axle of the front wheel 18 to calculate revolutions of the front wheel 18, or to the front fork and another cooperated sensor is connected to the front wheel 18 to calculate revolutions of the front wheel 18. The speed of the bicycle 21 is obtained by the revolutions of the front wheel 18, the diameter of the front wheel 18 and the peripheral length of the front wheel 18.

As shown in FIG. 3, assume that the current speed of the bicycle 1 is 25 km/hr, when the rider presses the constant speed button 17 while the bicycle 1 is moving, the controller 2 receives the current speed value 142 of 25 km/hr from the speed detector 14 and sets the current speed value 142 as the preset constant-speed setting value 21. When the speed of the bicycle 1 is larger than the preset constant-speed setting value 21, the controller 2 reduces the output of the motor 12 and the battery 13. When the speed of the bicycle 1 is smaller than the preset constant-speed setting value 21, the controller 2 increases the output of the motor 12 and the battery 13.

Figure 4:
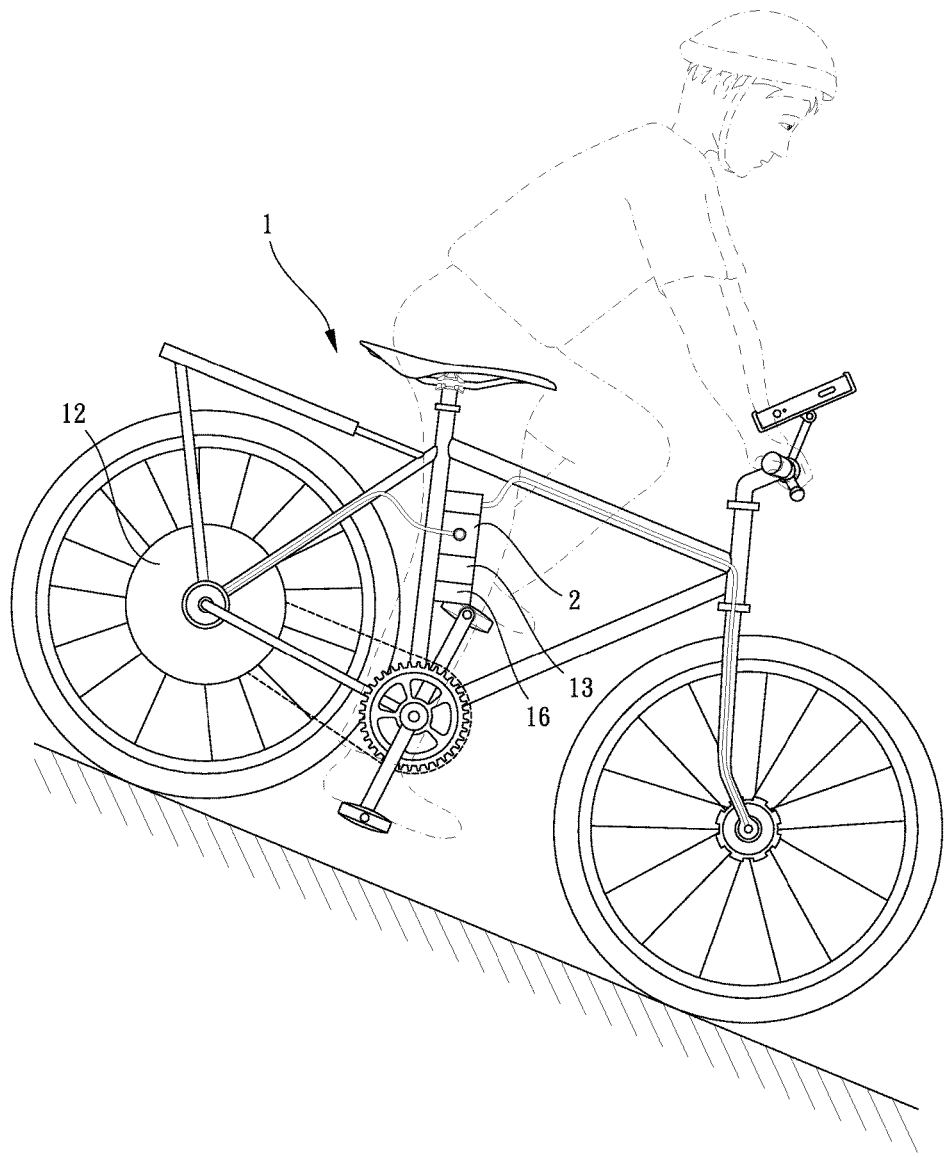
FIG. 4 shows that the electric bicycle with the speed control system of the present invention moves along a downhill road.
Figure 5:
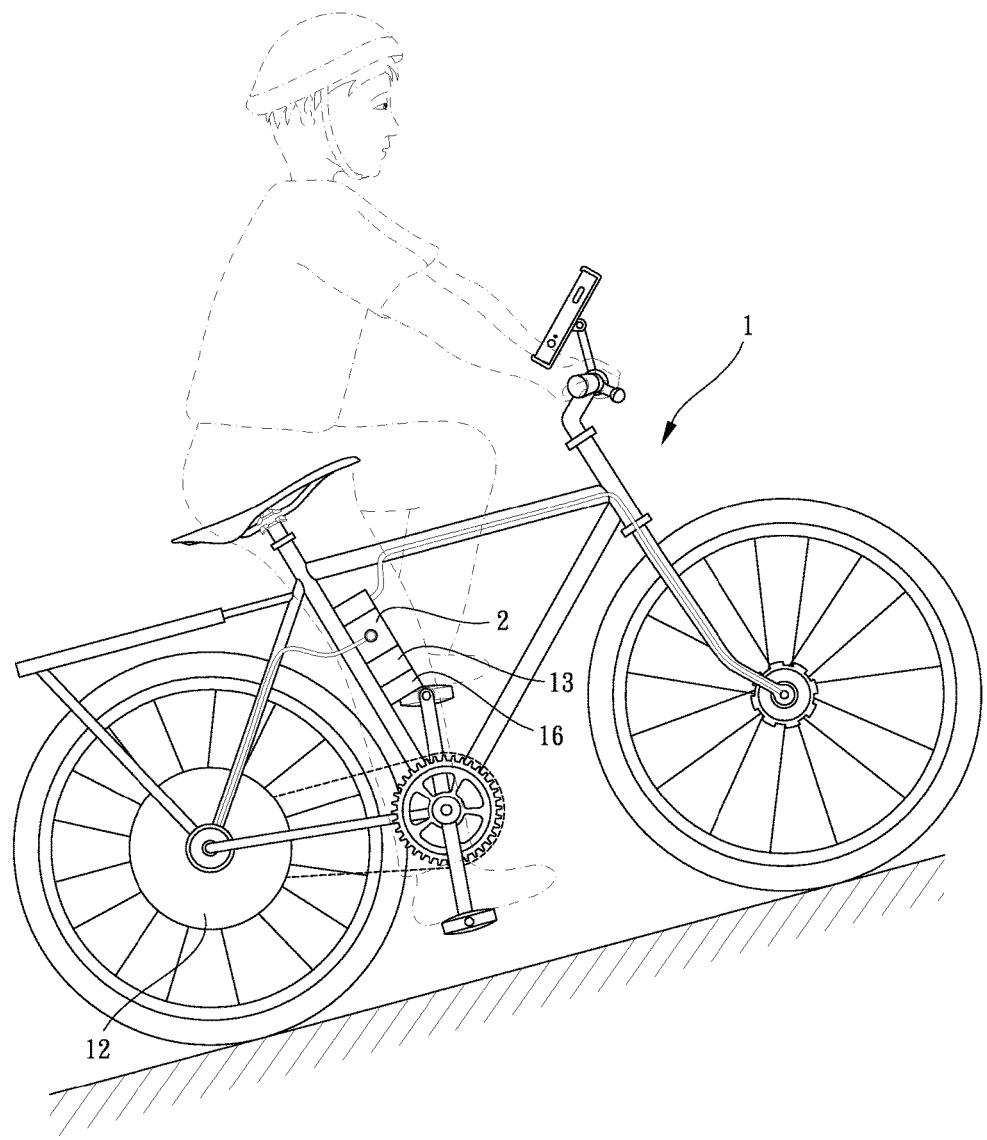
FIG. 5 shows that the electric bicycle with the speed control system of the present invention moves along an uphill road.

As shown in FIGS. 4 and 5, the controller 2 receives the value of road slope from the slope detector 16 and adjusts output of the motor 12 and the battery 13. When the slope detector 16 detects that the bicycle 1 is moving along a downhill road, as shown in FIG. 4, the controller 2 reduces output of the motor 12 and the battery 13 to keep the bicycle 1 in a safer status. When the slope detector 16 detects that the bicycle 1 is moving along an uphill road, as shown in FIG. 5, the controller 2 increases output of the motor 12 and the battery 13 to assist the rider to operate the bicycle 1.

The controller 2 changes the output of the motor 12 and the battery 13 according to the current speed so that the motor 12 assists the rider to operate the bicycle instantly.

While we have shown and described the embodiment in accordance with the present invention, it should be clear to those skilled in the art that further embodiments may be made without departing from the scope of the present invention.

What is claimed is:

1. A speed control system for electric bicycles, comprising:
    a bicycle having pedals, a motor and a battery which provides electric power to the motor;
    a speed detector connected to the bicycle and detecting speed of the bicycle so as to create a current speed value, and
    a controller connected to the bicycle and electrically connected to the motor, the battery and the speed detector, a constant-speed button electrically connected to the controller by a control cable, when the constant speed button is pressed while the bicycle is moving, the controller receives the current speed value from the speed detector and sets the current speed value as a preset constant-speed setting value, the controller receiving the current speed value from the speed detector, and comparing the current speed value with the preset constant-speed setting value so as to adjust output of the motor and the battery, when the current speed value is larger than the preset constant-speed setting value, the controller reduces the output of the motor and the battery, when the current speed value is smaller than the preset constant-speed setting value, the controller increases the output of the motor and the battery.

2. The speed control system for electric bicycles as claimed in claim 1, wherein a display member is connected to the controller so as to display speed of the bicycle detected by the speed detector, the controller monitors electric power of the battery, and the electric power in the battery is displayed on the display member.

3. The speed control system for electric bicycles as claimed in claim 2, wherein a constant-speed button is electrically connected to the controller by a control cable, when the constant speed button is pressed when the bicycle is moving, the controller receives the current speed value from the speed detector and sets the current speed value as the preset constant-speed setting value.

4. The speed control system for electric bicycles as claimed in claim 2, wherein the display is wirelessly connected to the controller.

5. The speed control system for electric bicycles as claimed in claim 1, wherein the speed detector includes a sensor which is connected to a front wheel of the bicycle so as to calculate revolutions of the front wheel, the speed detector calculates the current speed value of the bicycle by the revolutions of the front wheel, a diameter of the front wheel and a peripheral length of the front wheel.

6. The speed control system for electric bicycles as claimed in claim 5, wherein a slope detector is connected to the controller, the controller receives a value of road slope from the slope detector and adjusts output of the motor and the battery, when the slope detector detects that the bicycle moves along a downhill road, the controller reduces output of the motor and the battery, when the slope detector detects that the bicycle moves along an uphill road, the controller increases output of the motor and the battery.

7. A speed control system for electric bicycles, comprising:
- a bicycle having pedals, a motor and a battery which provides electric power to the motor;
- a speed detector connected to the bicycle and detecting speed of the bicycle so as to create a current speed value, a display member connected to the controller so as to display speed of the bicycle detected by the speed detector, the controller monitoring electric power of the battery, the electric power in the battery being displayed on the display member, and
- a controller connected to the bicycle and electrically connected to the motor, the battery and the speed detector, a constant-speed button electrically connected to the controller by a control cable, when the constant speed button is pressed while the bicycle is moving, the controller receives the current speed value from the speed detector and sets the current speed value as a preset constant-speed setting value, the controller receiving the current speed value from the speed detector, and comparing the current speed value with the preset constant-speed setting value so as to adjust output of the motor and the battery, when the current speed value is larger than the preset constant-speed setting value, the controller reduces the output of the motor and the battery, when the current speed value is smaller than the preset constant-speed setting value, the controller increases the output of the motor and the battery.

8. The speed control system for electric bicycles as claimed in claim 7, wherein the display is wirelessly connected to the controller.

9. The speed control system for electric bicycles as claimed in claim 7, wherein the speed detector includes a sensor which is connected to a front wheel of the bicycle so as to calculate revolutions of the front wheel, the speed detector calculates the current speed value of the bicycle by the revolutions of the front wheel, a diameter of the front wheel and a peripheral length of the front wheel.

10. The speed control system for electric bicycles as claimed in claim 9, wherein a slope detector is connected to the controller, the controller receives a value of road slope from the slope detector and adjusts output of the motor and the battery, when the slope detector detects that the bicycle moves along a downhill road, the controller reduces output of the motor and the battery, when the slope detector detects that the bicycle moves along an uphill road, the controller increases output of the motor and the battery.

11. A speed control system for electric bicycles, comprising:
- a bicycle having pedals, a motor and a battery which provides electric power to the motor;
- a speed detector connected to the bicycle and detecting speed of the bicycle so as to create a current speed value, the speed detector including a sensor which is connected to a front wheel of the bicycle so as to calculate revolutions of the front wheel, the speed detector calculating the current speed value of the bicycle by the revolutions of the front wheel, a diameter of the front wheel and a peripheral length of the front wheel;
- a controller connected to the bicycle and electrically connected to the motor, the battery and the speed detector, the controller having a preset constant-speed setting value, the controller receiving the current speed value from the speed detector, and comparing the current speed value with the preset constant-speed setting value so as to adjust output of the motor and the battery, when the current speed value is larger than the preset constant-speed setting value, the controller reduces the output of the motor and the battery, when the current speed value is smaller than the preset constant-speed setting value, the controller increases the output of the motor and the battery, and
- a slope detector connected to the controller, the controller receiving a value of road slope from the slope detector and adjusting output of the motor and the battery, when the slope detector detects that the bicycle moves along a downhill road, the controller reduces output of the motor and the battery, when the slope detector detects that the bicycle moves along an uphill road, the controller Increases output of the motor and the battery.

12. The speed control system for electric bicycles as claimed in claim 11, wherein a display member is connected to the controller so as to display speed of the bicycle detected by the speed detector, the controller monitors electric power of the battery, and the electric power in the battery is displayed on the display member.

13. The speed control system for electric bicycles as claimed in claim 11, wherein a constant-speed button is electrically connected to the controller by a control cable, when the constant speed button is pressed when the bicycle is moving, the controller receives the current speed value from the speed detector and sets the current speed value as the preset constant-speed setting value.

14. The speed control system for electric bicycles as claimed in claim 12, wherein a constant-speed button is electrically connected to the controller by a control cable, when the constant speed button is pressed when the bicycle is moving, the controller receives the current speed value from the speed detector and sets the current speed value as the preset constant-speed setting value.

15. The speed control system for electric bicycles as claimed in claim 12, wherein the display is wirelessly connected to the controller.

* * * * *